No. 694,729. Patented Mar. 4, 1902.
J. P. CLEAL.
CASH REGISTER.
(Application filed May 26, 1900.)
(No Model.) 9 Sheets—Sheet 1.
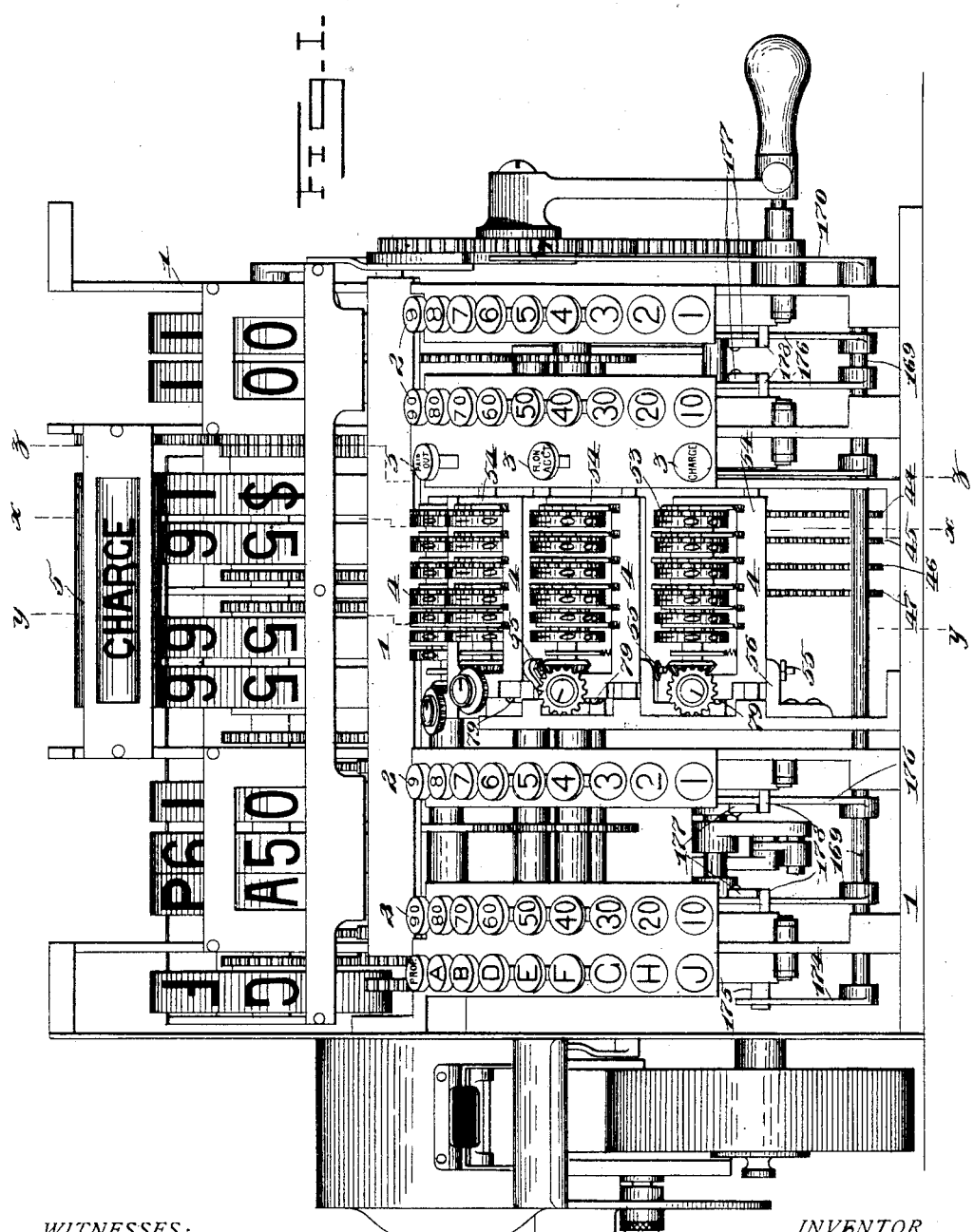
WITNESSES: INVENTOR.
Wm. McCarthy Joseph P. Cleal.
William Huggy BY Alvan Macauley
ATTORNEY.

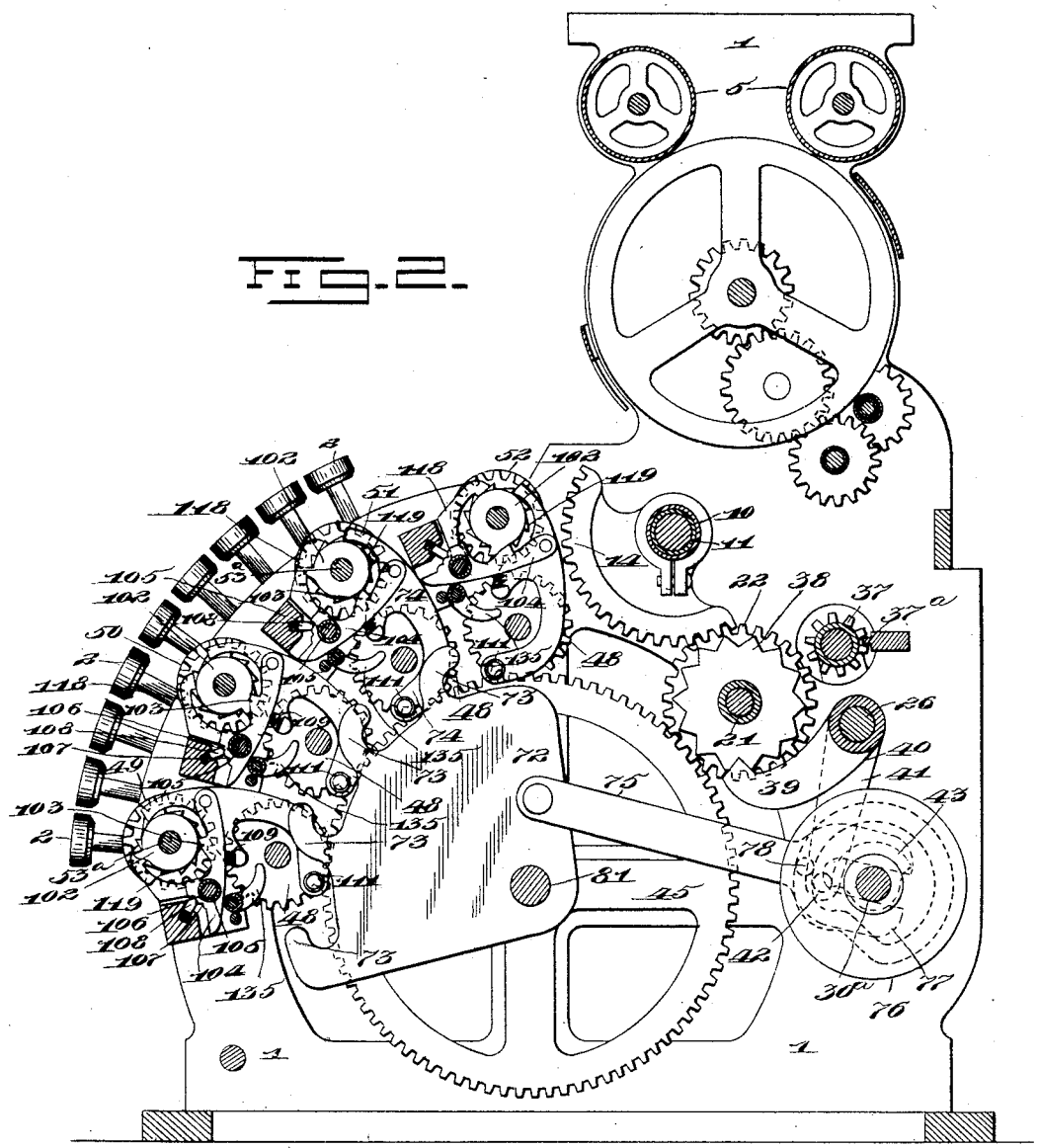

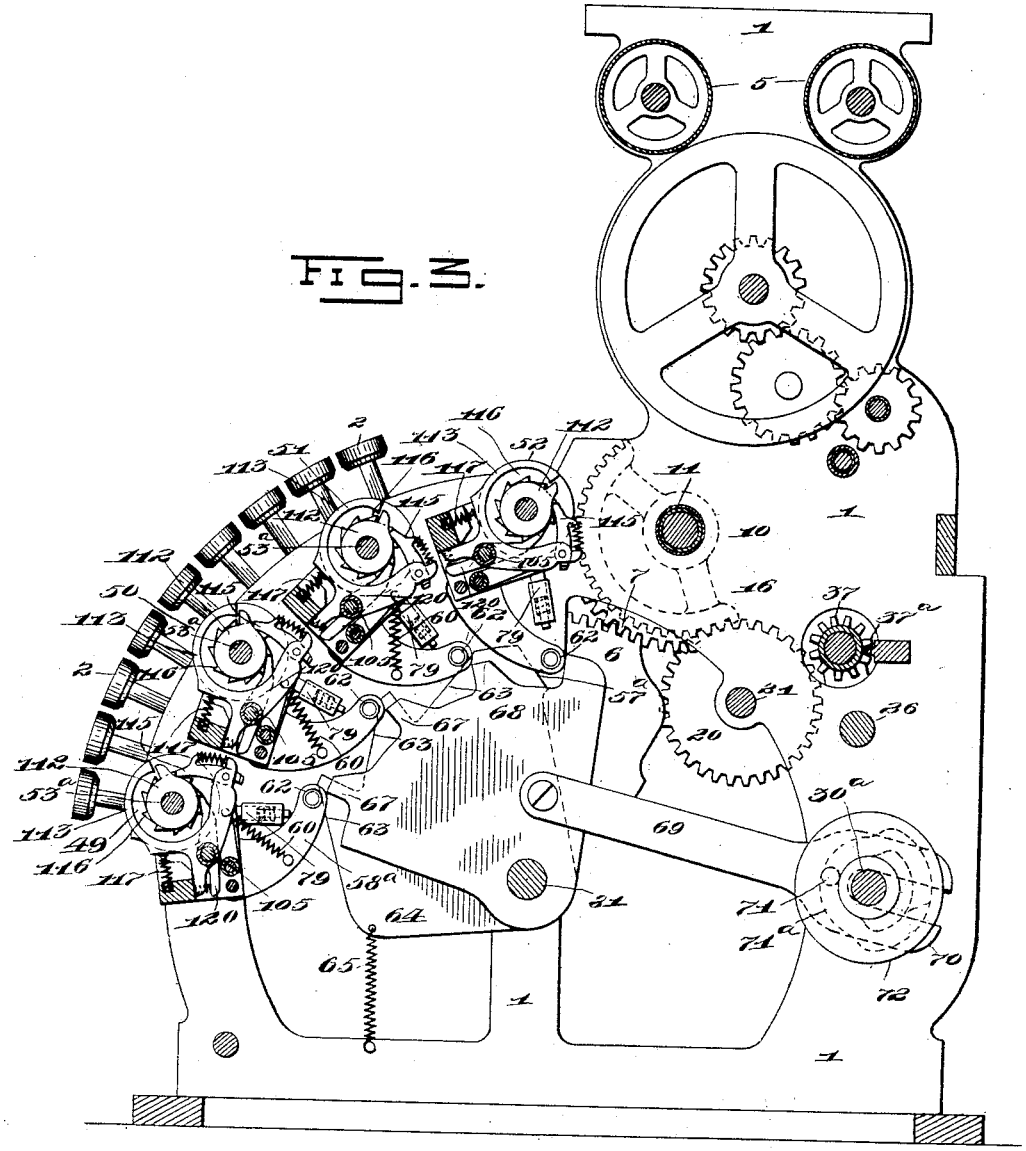

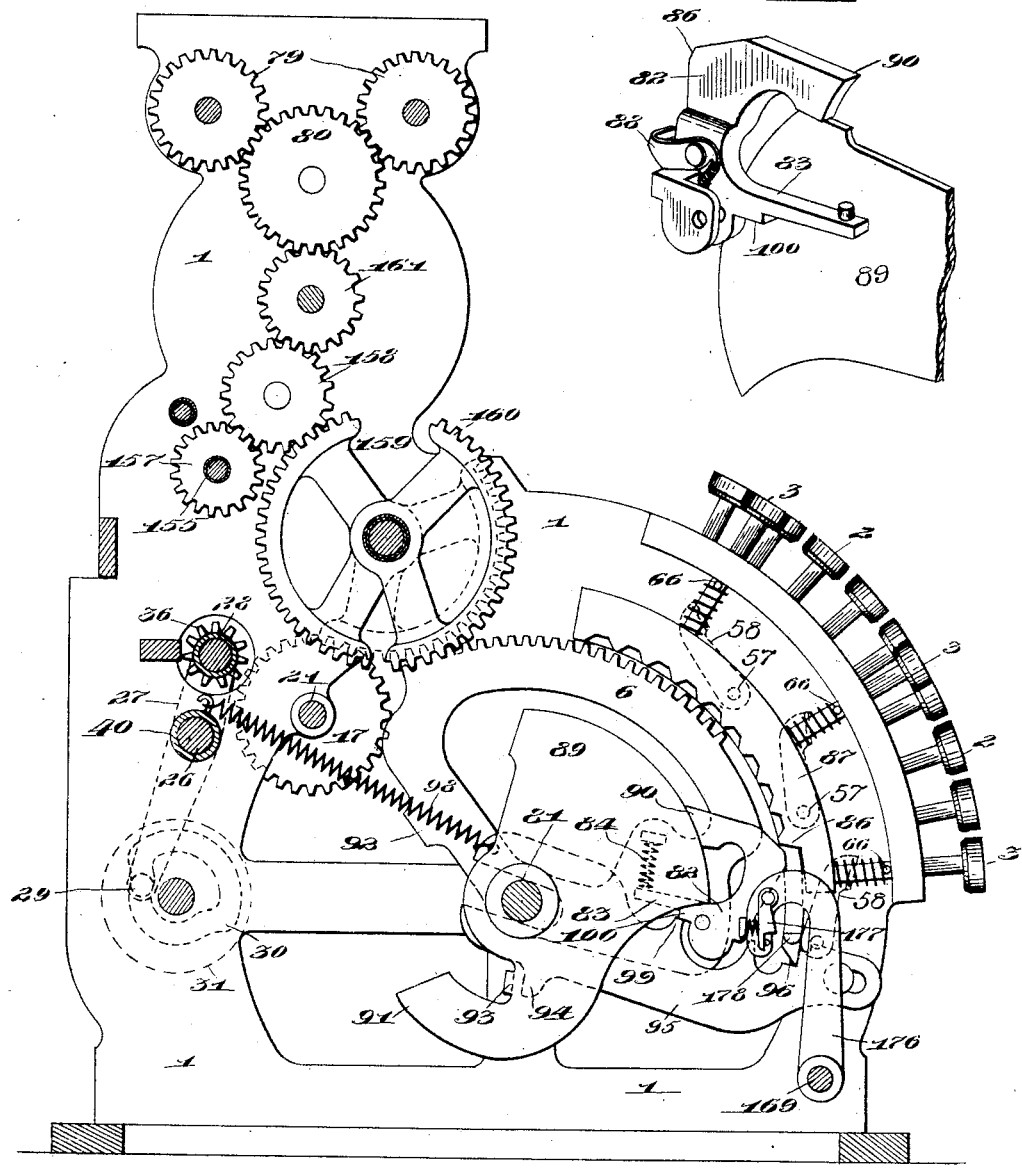

No. 694,729. Patented Mar. 4, 1902.
J. P. CLEAL.
CASH REGISTER.
(Application filed May 26, 1900.)
(No Model.) 9 Sheets—Sheet 5.
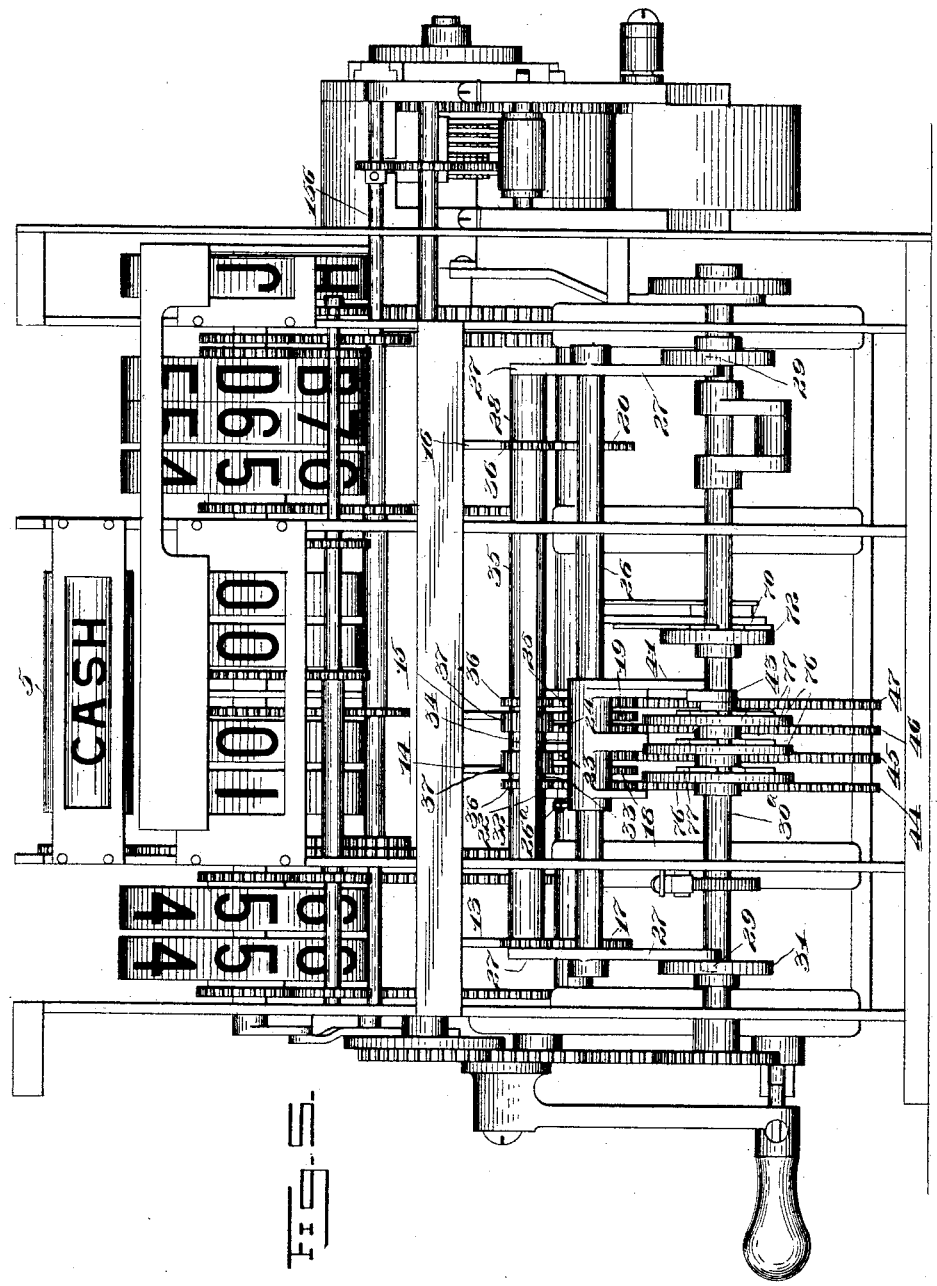
WITNESSES: INVENTOR.
Joseph P. Cleal
BY Alvan Macauley
ATTORNEY No. 694,729. Patented Mar. 4, 1902.
J. P. CLEAL.
CASH REGISTER.
(Application filed May 26, 1900.)
(No Model.) 9 Sheets—Sheet 6.
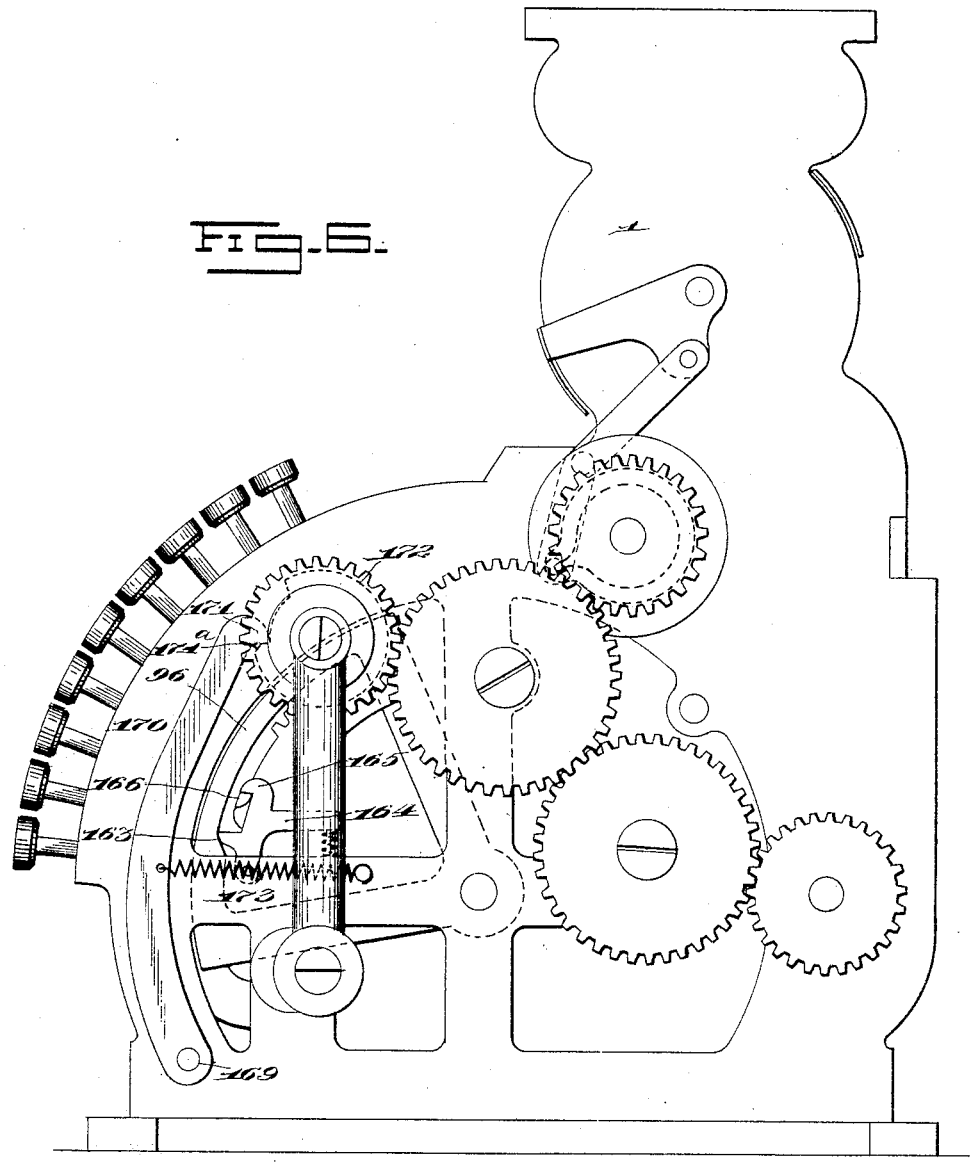

No. 694,729. Patented Mar. 4, 1902.
J. P. CLEAL.
CASH REGISTER.
(Application filed May 26, 1900.)
(No Model.) 9 Sheets—Sheet 7.
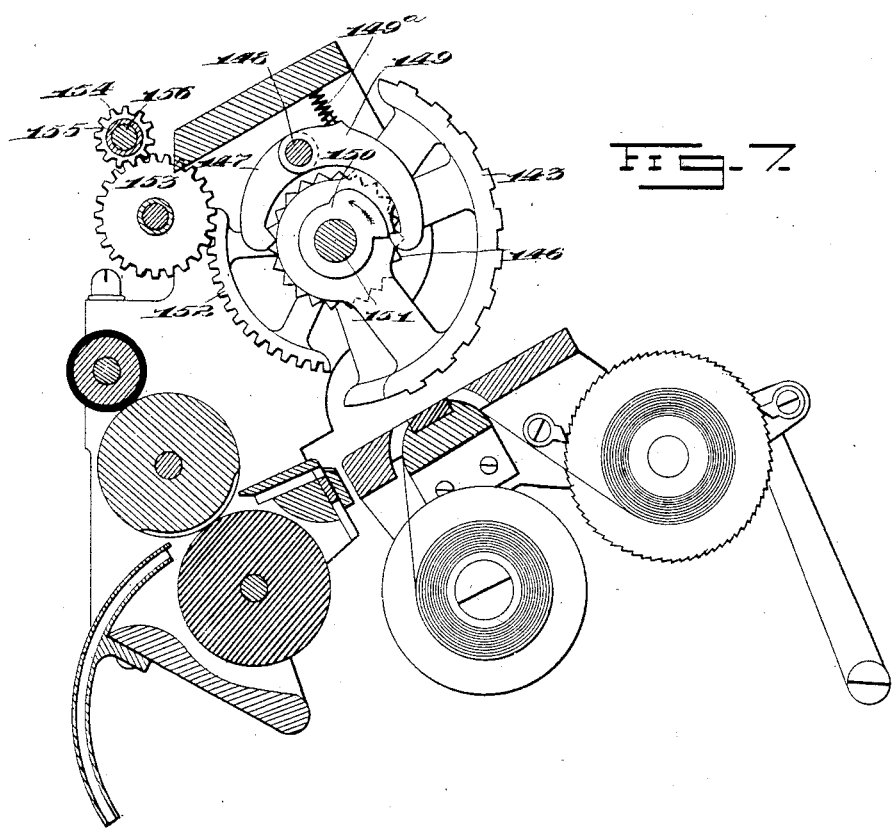
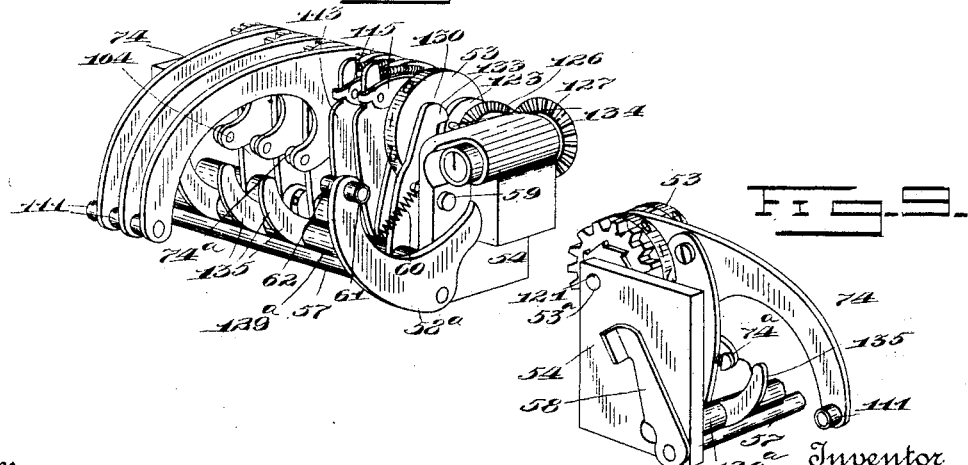

No. 694,729. Patented Mar. 4, 1902.
J. P. CLEAL.
CASH REGISTER.
(Application filed May 26, 1900.)
(No Model.) 9 Sheets—Sheet 8.
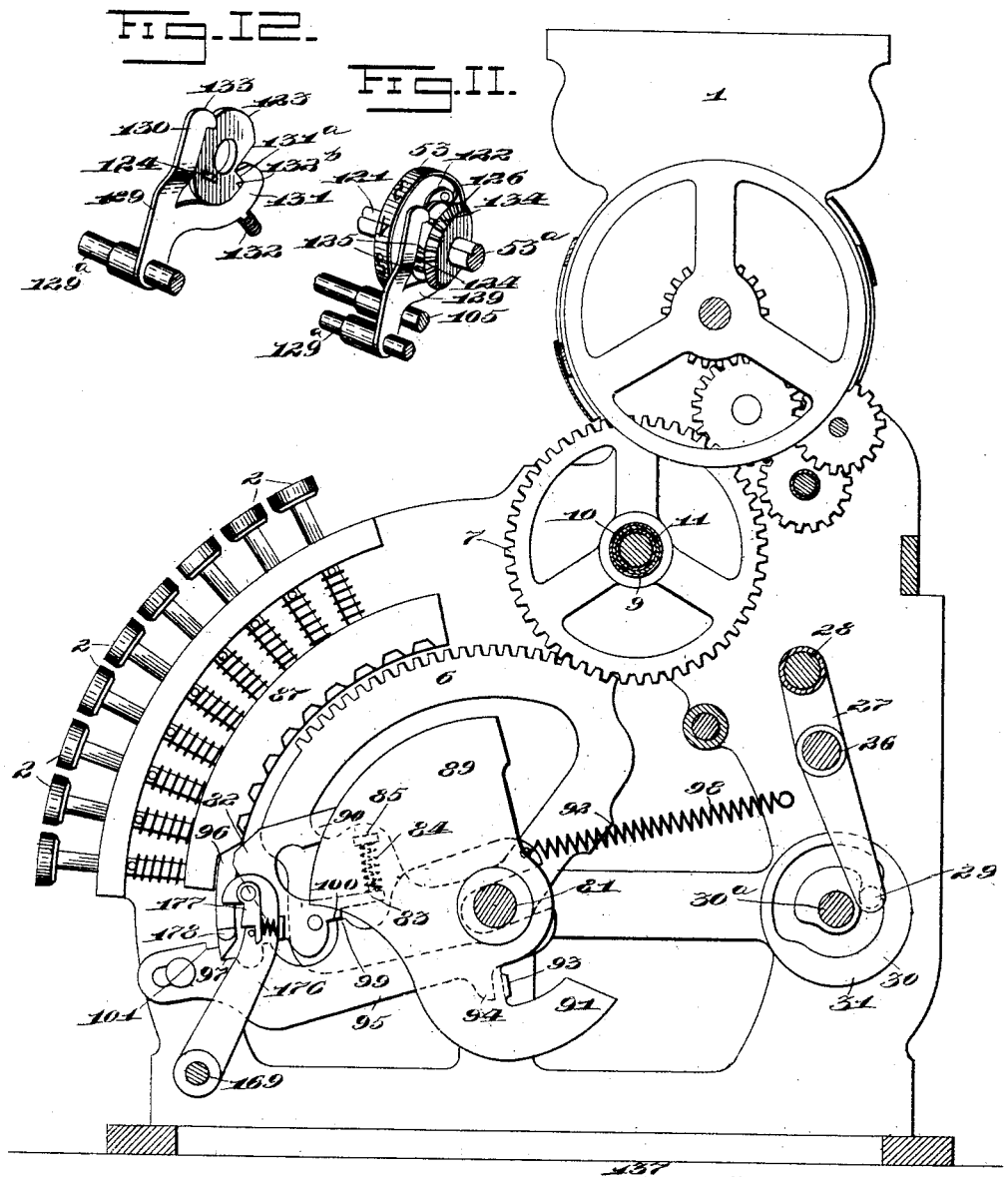
Witnesses
Wm. McCarthy
William Muzzy
Inventor
J. P. Cleal
By Alvan Macauley
Attorney No. 694,729. Patented Mar. 4, 1902.
J. P. CLEAL.
CASH REGISTER.
(Application filed May 26, 1900.)
(No Model.) 9 Sheets—Sheet 9.
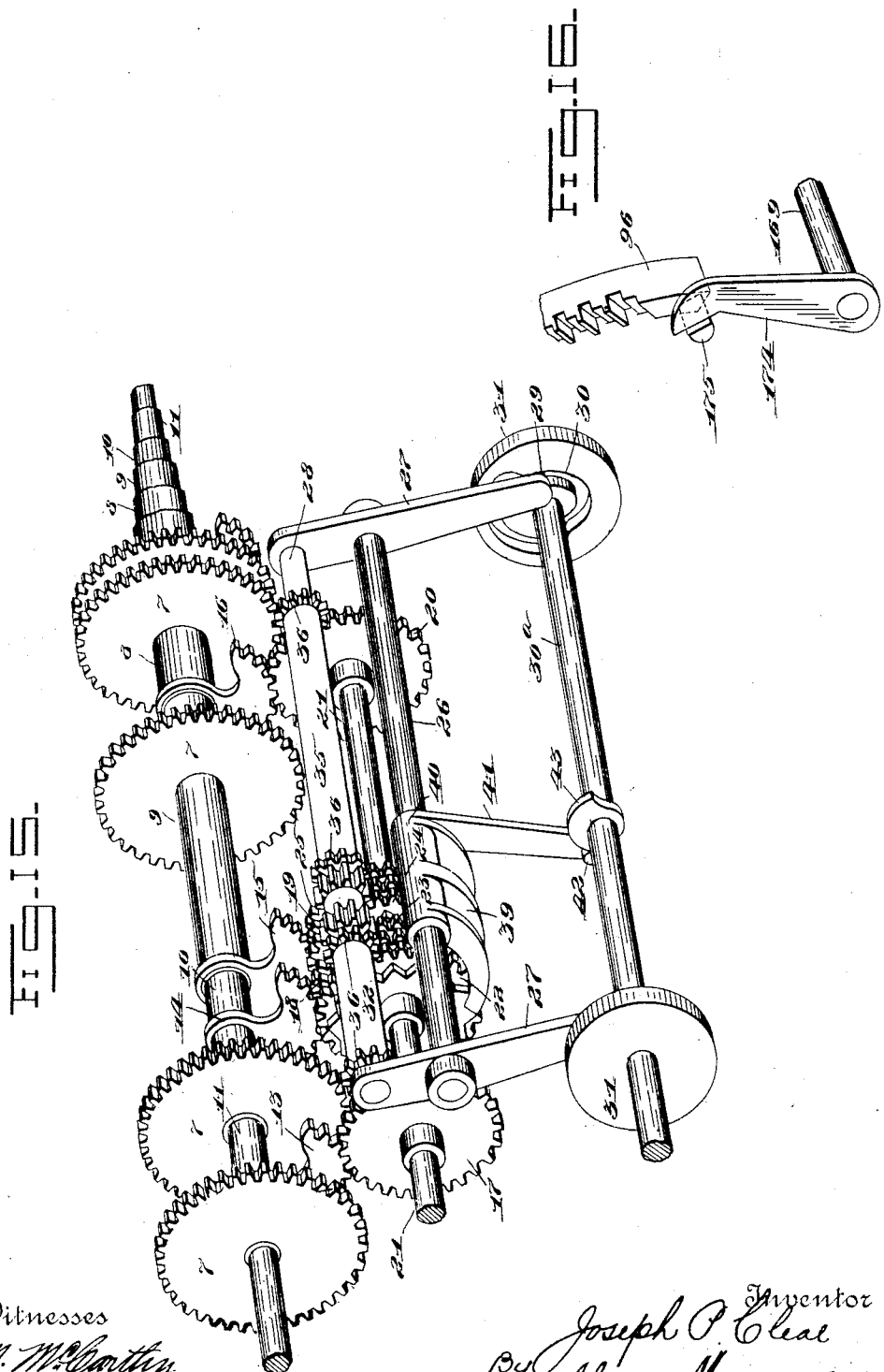

UNITED STATES PATENT OFFICE.

JOSEPH P. CLEAL, OF DAYTON, OHIO, ASSIGNOR TO THE NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 694,729, dated March 4, 1902.

Application filed May 26, 1900. Serial No. 18,058. (No model.)

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in that class of registers more commonly designated "department" or "multiple" counter-registers, in which a number of independent counters are employed to keep the different classes of accounts separated.

The present invention is an improvement on the patent of Messrs. Cleal and Reinhard of April 13, 1897, which is numbered 580,378, and I will therefore hereinafter refer to the said patent for detail descriptions of the several parts illustrated in connection with my present improvements.

One of the several objects of the invention is to provide an improved cash-register containing a totalizing-counter and a plurality of independent department-counters, any one of which may be thrown into operative connection with the actuating devices at will, and thus have registered thereon the amount of a transaction.

In the appended drawings, forming part of this specification, Figure 1 represents a front elevation of the devices embodying my invention applied to a machine of the class mentioned, the cabinet and cash-drawer being removed. Fig. 2 represents a vertical transverse section through the same on the line *x x* of Fig. 1. Figs. 3 and 4 represent similar views on lines *y y* and *z z*, respectively. Fig. 5 represents a rear elevation of the said devices. Fig. 6 represents an end elevation of the machine embodying said improvements. Fig. 7 represents an enlarged detail vertical section through the printer. Fig. 8 represents an enlarged detail perspective view of one of the independent counters, taken from the rear. Fig. 9 represents a similar view taken from the opposite end of the counter, the same being partly broken away. Fig. 10 represents a vertical transverse section through the machine on the line of one of the banks of amount-keys. Fig. 11 represents a detail perspective view of one of the counter-shafts, a counter-wheel, operating-cam, and other coöperating parts. Fig. 12 represents a detail perspective view of the counter-cam and coöperating pawl. Fig. 13 represents a detail perspective view of said cam and the cam-arm and coacting devices for moving the same. Fig. 14 represents an enlarged detail perspective view of one of the segment-latches. Fig. 15 represents a perspective view of the shaft and nested sleeves for operating the printer and the gearing for connecting the same to the counter-operating devices; and Fig. 16 represents a detail perspective view of the releasing rock-shaft, its arm, and the detent carrying the operating-stud for tripping the machine.

In the said drawings, 1 represents the frame of the machine; 2, the amount-keys; 3, the special counter-keys; 4, the special or department counters, and 5 the special indicators.

The register-operating devices, amount and letter indicators, and printing devices are substantially the same as described in the aforesaid patent, and reference is therefore made to the same for a detail description of said parts. One exception to the above statement is in the manner of operating the rack-segments 6 and arresting the same according to the value of the key operated. The segments in this improved structure, as in the patent above mentioned, are journaled upon a transverse rock-shaft 81, and each is provided with a pivoted latch 82, having an arm 83, which is engaged by a coiled spring 84, interposed between said arm and a lug 85, mounted on said segment. (See Figs. 10 and 14.) By this means the latch normally tends to spring rearward to bring its latching-nose 86 free of the teeth of the rigid latching-segment 87. The latch is thrown forward against the tension of its spring by a pivoted spring-pressed pawl 88, mounted thereon (see Fig. 14) and adapted upon the upstroke of the segment to contact with the protruding inner end of the operated key, and thus rock the latch forward. The rocking movement of each rack-segment is accomplished through the medium of a cam-disk 89, fast to the rock-shaft 81 and arranged to contact with a bevel-ended arm 90, formed on the latch 82, to lift the latter when said shaft is rocked. After the latch has been thrown forward, as above described, the cam-disk passes from under the arm 90 and engages the beveled end of the same to force the latch forward into locking engagement with the segment 87. The disk holds the latch in this position until the succeeding operation of the machine, when said disk again moves down and releases the latch and returns the rack-segments to normal position. This return of the segment is accomplished by an arm 91, formed on the disk and arranged to contact with a lug 92 on said segment to rock the latter upon the shaft 81. The cam-disk further carries a lug 93, which is so located as to contact with and operate a lug 94, formed on a latching-slide 95, to cause said slide to release the key-detent 96 in a manner well known in the art and shown in the aforesaid patent. The lower end of this detent, as shown in Fig. 10, normally lies in a notch 97 of the slide 95 to hold the latter forward against the tension of a coiled spring 98, which connects it to the main frame. When the slide is in this position, a shoulder 99, formed thereon, engages a shoulder 100 on the latch, and thus holds said latch in a forward position, so that it cannot rise, which construction also prevents the rising of its respective rack-segment. When the detent 96 is elevated upon the operation of a key, the slide 95 is drawn longitudinally by the spring 98 until said detent becomes seated in a notch 101, formed in said slide, and is thus prevented from returning and releasing the key. Simultaneous with the above movement the shoulder 99 is moved from under the shoulder 100, and thus leaves the latch 82 free to rise after the disk 89 has made its downward stroke and passed below the arm 90. Each of the detents 96 is also formed with an inclined shoulder 163, (see Fig. 6,) which when said detent is elevated contacts with and operates a pivoted spring-pressed latch 164, suitably mounted on the frame. Each of these latches is formed with a hook-nose 165, which coöperates with a lug 166, formed on its respective segment 6, to lock the latter in its lower position until the detent is elevated by the depression of one of the keys. When a key is depressed, its detent 96 is elevated, as described in the aforesaid patent, and its lug 163 forces the latch 164 rearward against the tension of its spring until the hook 165 is disengaged from the lug 166. The operating-segment is then free to be actuated.

Each of the aforesaid operating rack-segments 6 of the amount-banks, which is, as described, arranged to be moved a distance equal to the value of the operated key, meshes with a gear-wheel 7, (see Figs. 10 and 15,) said gears being mounted, respectively, upon nested sleeves 8, 9, 10, and 11, said sleeves being connected to and operating the printing devices, as set forth in said patent and hereinafter described. The said shaft and sleeves are also provided, respectively, with segmental racks 13, 14, 15, and 16, which mesh, respectively, with gear-wheels 17, 18, 19, and 20, independently journaled upon a transverse shaft 21. (See Fig. 15.) This latter shaft further supports four independent gear-wheels 22, 23, 24, and 25, which are coupled, respectively, to the gears 17, 18, 19, and 20, as follows: A rock-shaft 26 is suitably journaled in the frame of the machine and is provided at each end with a lever 27, fast thereto. The inner ends of these levers are connected by a shaft 28, while the outer ends are provided, respectively, with studs 29, which project into the cam-grooves 30 of disks 31, secured to one of the rotation-shafts 30$^a$ of the machine. (See Fig. 10.) The said shaft 28 supports four independent rotatable sleeves 32, 33, 34, and 35, the first and last of which are provided at each end with a pinion 36. These pinions mesh with the gear-wheels 17 and 22 and 20 and 25, so as to cause the same to rotate together in the order named. The wheels 18 and 23 and 19 and 24 are also coupled by means of wide-tooth pinions 37, mounted on the sleeves 33 and 34. When the shaft 28 is swung back, the pinions 36 and 37 engage an elongated tooth 37$^a$, formed on a portion of the main frame, and thus hold said pinions against any accidental movement until the shaft is again moved forward. (See Fig. 3.)

It will be observed from the above that when the shaft 28 is thrown forward by the movements of the levers 27 that the pinions 36 and 37 and gear-wheels 17, 18, 19, 20, 22, 23, 24, and 25 are thrown into mesh during the forward movement of the machine, so as to cause a forward movement of the operating-gears 22, 23, 24, and 25 equal to the movement of the rack-segments; but during the reverse movements of said racks the pinions are thrown back out of mesh, and thus leave the said gears 22, 23, 24, and 25 free. These latter gears are provided each with an alining and stop wheel 38, (see Fig. 2,) which is adapted to be engaged by one of a series of locking and alining pawl-arms 39, rigidly secured to a rocking frame 40, mounted loosely on the shaft 26. The frame is connected to one of the springs 98, so that it is rocked to normally draw the pawls out of contact with the wheels 38 to leave them free to operate, as shown in Fig. 4. Said frame 40 is also formed with a pendent arm 41, having an antifriction-roller 42 so mounted thereon as to be engaged by a cam 43 on the shaft 30$^a$, so that when said shaft is rotated the frame will be rocked and the locking-pawls brought into engagement with the alining-wheels to prevent any overthrow of the operating devices.

The aforesaid operating-wheels 22, 23, 24, and 25 mesh continuously with large operating gear-wheels 44, 45, 46, and 47, which latter in turn mesh continuously with gear-wheels 48, arranged in series or sets, one set being for each of the counters 49, 50, 51, and 52. (See Fig. 2.) Each of these counters comprises a series of counter-wheels 53, journaled upon a shaft 53ª, mounted in a frame 54, (see Figs. 8 and 9,) which is pivotally mounted in the main frame and is limited in its rearward movement by an adjustable bolt 55, passed through a suitable bracket 56, mounted on the said main frame, as best shown in Fig. 1. Each of the said counter-frames is provided with a rock-shaft 57, (see Figs. 8 and 9,) having an angular trip-lever 58 at one end and a bell-crank operating-lever 58ª at the opposite end. This latter lever is limited in its movements by a stud 59, mounted on the counter-frame, and is normally held in a retracted position by a coiled spring 60, which connects it with said counter-frame. The outer end of said lever is provided with two antifriction-rollers 61 and 62. The roller 61 of each of the three lower counters is so located as to contact with one of a series of inclined projections 63, formed on a pivoted segmental frame 64. (See Fig. 3.) This frame is journaled on the shaft 81 and is normally drawn down by a coil-spring 65 to bring the projections 63 against the rollers 61, so that if said rollers are subsequently forced forward the frame will be rocked for a purpose hereinafter described.

When one of the special keys 3, which are of the same construction as the numeral-keys, is operated, a laterally-projecting pin 66, which is mounted on the same, (see Fig. 4,) engages its respective trip-lever 58 and forces the same forward, so as to rock the lever 58ª and cause its antifriction-roller 62 to project into the path of one of a series of projections 67, formed on a pivoted segment 68. (See Fig. 3.) As this segment moves downward upon the operation of the machine the counter-frame to be operated is rocked forward by the said lever 58ª until the gears of the counter-wheels mesh with the gears 48. The said segment 68 is actuated upon every operation of the machine to effect the above results by a bar 69, which is pivotally connected thereto and is provided at its rear end with a yoke 70 and a laterally-projecting pin 71. Said yoke straddles the shaft 30ª, while the pin engages a cam-groove 71ª, formed in a disk 72, fast to said shaft. When the segment 68 is rocked by the operation of the machine as above described, the projections 67 are moved beneath the rollers 62 of the unoperated arms 58ª, and thus lock said arms against operation until the segment 68 returns to normal position.

The bell-crank arm 58ª of the totalizing-counter 52 is so arranged as to normally lie in the path of its respective projection 67, so as to be always thrown forward to operative position upon the operation of the machine except when one of the keys of the three special counters is operated. Such operation, as before described, moves the segmental frame 64, and thus forces the incline edge 57ª of the same against the roller 61 of the said totalizing-counter to rock the latter out of operative position.

It will be seen from the above that the totalizing-counter 52 will always be thrown into operative position upon each operation of the machine unless one of the three special counters 49, 50, and 51 is operated, in which case it will be thrown out, as above described, and the registration made only on the special counter operated.

Each of the counters is normally thrown back out of operative position by a spring-pressed plunger 79, mounted on the main frame and engaging a portion of the counter-frame. (See Fig. 3.)

Segmental frames 72 are pivotally mounted upon the shaft 81 between the large gears 44, 45, 46, and 47 and are formed, respectively, with hook-arms 73, which are arranged to operate suitable transfer-arms 74, with which the counters are provided, as shown in Fig. 2. These frames 72 are arranged to be operated successively from right to left upon the operation of the machine and receive motion through link-bars 75 from a series of cam-grooved disks 76, mounted on the rotation-shaft 30ª. Each of the bars 75 is pivotally connected to its respective segments and is formed at its opposite end with a yoke 77 and a pin 78, the former embracing the shaft 30ª and the latter projecting into the cam-groove of its respective disk. After a transfer-arm 74 has been thrown backward by the complete revolution of one of the counter-wheels it is again forced forward by one of the arms 73, and thus moves the next higher counter-wheel one notch. This transfer is effected in the following manner: After one of the first three counter-wheels of any of the counters has made a complete revolution which equals one unit of the next higher wheel a cam 102, mounted thereon, (see Fig. 2,) will engage a nose 103, formed on one of a series of levers 104, which are journaled on a transverse shaft 105, and thus actuate said lever. This lever 104 is pivoted at its upper end to its respective lever 74 and is formed at its lower end with two notches 106 and 107, adapted to receive the end of a spring-pressed retaining-plunger 108 for yieldingly holding said lever in the positions to which it is moved. Each of the levers 74 is thus supported and held in position by its respective lever 104. A coil-spring 109 is interposed between a stud 74ª, formed on each of the said levers 74 and its lever 104, so as to force the operative end of the said lever 74 into contact with a ratchet-wheel 119, fast to its respective counter-wheel. The lower end of each lever 74 is provided with an antifriction-roller 111, which when the lever has been tripped by the operation of the lever 104, as before described, drops to a position in the path of one of the projections 73, so as to be forced forward thereby when the segment 72 is operated to effect the transfer by turning the ratchet-wheel forward one tooth.

It will be observed that the above-described transfer devices are only provided for the first three counter-wheels, the transfers between the remaining wheels being accomplished as follows: Each of the fourth and fifth wheels of the several counters is provided, as shown in Fig. 3, with a transfer-cam 112, which when one of said wheels has made a complete revolution engages and rocks one of a series of loop-shaped levers 113, pivoted on the transverse shafts 105. Each of the levers 113 is provided with a pivoted spring-pressed pawl 115, which engages a ratchet-wheel 116, fast to the next higher counter-wheel. Each of the pawls 115 is bent at an angle at its inner end, as shown in Fig. 8, so that when the pawl is rocked forward by its lever 113 said angular portion will engage the edge said of latter lever, and thus limit the movement of the pawl. By this structure all overthrow is prevented, as the pawl 115 becomes rigid at the end of its stroke and cannot rise to allow an additional tooth of the ratchet-wheel to pass under it. When one of said loop-levers is operated, it moves the next higher counter-wheel one tooth and effects the transfer. The levers 113 after being forced in one direction by their respective cams 112 are returned to their normal positions by coil-springs 117, interposed between said levers and the counter-frames.

The first four counter-wheels of each counter are provided with retaining-pawls 118, suitably pivoted on the counter-frames and spring-pressed to engage the ratchet-wheels 119, and thus prevent retrograde movement of the counter-wheels. (See Fig. 2.)

The retaining-pawls 120 for the two highest wheels of each counter are, as shown in Fig. 3, pivoted on the shafts 105 and are spring-pressed to engage the ratchets 116 and prevent retrograde movement of the same.

When it is desired to turn any one of the several counters to zero, this result is accomplished by rotating the shaft 53ª of said counter so as to cause the wall of a groove 121, formed in said shaft, to engage or pick up spring-pressed pawls 122, mounted on the respective counter-wheels, as shown in Fig. 11. The shaft 53ª receives its movement through a cam 123, fast thereon and carrying a pin 124, which projects between two spaced pins 125, mounted on a bevel-pinion 126, which is journaled on the end of said shaft. By means of the above-described lost-motion connection between the pinion and the cam the latter is capable of a slight independent movement, whereby it may be moved to release a lever 129, hereinafter described. The pinion 126 is rotated by a bevel-pinion 127, which is mounted on the counter-frame and is arranged to be operated through a suitable key-and-lock mechanism in a manner well known in the art and needing no further description here.

It is very desirable in turning the counter-wheels to zero to disengage the transfer-levers 74 from the ratchet-wheels to prevent a transfer upon the succeeding operation of the machine. To effect this result, the cam 123 coöperates with a yoke-lever 129, fast on a rock-shaft 129ª and having its respective arms 130 and 131 upset, so as to project into different vertical planes. The lever 129 is normally forced forward to cause the hook-arm 131 to engage the periphery of the cam 123 by a coil-spring 132, interposed between said lever and the counter-frame. The hook end of the arm 131 normally rests in the reduced portion of the cam against a shoulder 131ª, whereby the cam is locked against any backward movement. The cam is further formed with a shoulder 131ᵇ, which the hook on arm 131 engages to prevent retrograde movement of the cam 123 after sufficient movement of the same has been made to turn the counter-wheels fully to zero. The arm 130 of the lever 129 is formed with a hook 133, which when the lever 129 is operated by the cam is projected into the path of an arresting-pin 134, fast to the pinion 126. When the parts are operated to turn the counter-wheels to zero, the hook 133 is of course moved into the path of the said pin 134 by the cam 123 and so held. It is therefore necessary to provide means for giving the cam an additional independent movement to allow the hook end of the arm 131 to pass into the reduced portion of the cam, and thus permit the arm 130 to move back far enough to release the pin 134 from the hook 133. This additional movement of the cam is effected through the medium of a pin 137, mounted thereon in such position as to be engaged by the bevel end of an arm 138, fast to the rock-shaft 105. (See Fig. 13.) This shaft carries a pin 140, which projects into a slot 141, formed in the hub of one of the levers 104. When the said lever is tripped or forced back by the cam upon the counter-wheel, as before described, the pin 140 simply plays in the slot 141; but as the cam 123 is rotated the pin 137 engages the forward edge of the arm 138 and forces the same back, which operation rocks the shaft 105 and causes the pin 140 to move to the end of the slot 141. The pin 137 then passes up into alinement with the bevel portion of the arm 138, so that when the shaft 105 is subsequently rocked, Fig. 13, and the arm moved forward said bevel portion will force the pin 137 forward and give the cam its final movement. The said additional movement of the cam brings the reduced portion of the same into alinement with the hook on arm 131, so that the same is forced forward by its spring, and thus moves the nose 133 out of the path of the pin 134 to leave the machine in condition to be again turned to zero. When the lever 129 is rocked by the movement of the cam 123, the shaft 129ª is also rocked to force rigid arms 135, mounted thereon, against the projections 74ª of the levers 74. This operation rocks the levers 74 on their fulcrums and disengages their operative ends from the ratchet-wheels of the counter. As long as the arms 135 remain against the studs 74ª the levers 74 will not engage the ratchet-wheels to make a transfer.

The above description relates to the counter-operating devices and the counters arranged to coöperate therewith, and I will now pass on to the description of the printing means, which also receive movement from said operating devices.

The type-segments 143 for the amount-banks are mounted side by side upon the outer ends of the nested sleeves 8, 9, 10, and 11, which carry gears meshing with the segments 6, substantially as described in the said patent and as shown in Fig. 10. One exception to the above statement is that each of the type-segments is provided with an alining star-wheel 146, said wheels being arranged to be engaged by alining pawls 147, fast to a rock-shaft 148, which is suitably mounted in the printer-frame and carries an operating-arm 149. (See Fig. 7.) This arm is forced forward by a spring 149ª, so as to engage a cam 150, fast to the rotation-shaft 151, upon which the type-segments are mounted, whereby upon each rotation of said shaft the type-segments are alined and locked during the time that the printing is taking place.

The special type-segment for printing the characters representing which of the several counters is employed for any particular transaction is mounted loose upon the outermost one of the nested sleeves and is provided with a segmental rack 152. (See Fig. 7.) This rack meshes with an idle pinion 153, which in turn meshes with a pinion 154, fast to a sleeve 155, mounted on a transverse shaft 156, as shown in Figs. 5 and 7. The sleeve 155, as best shown in Fig. 4, carries a pinion 157, which meshes with an idle pinion 158. This latter pinion in turn meshes with a segmental rack 159, journaled on the nested sleeves and carrying a duplicate rack 160, which meshes with its respective segment 6, so as to receive the proper degree of movement therefrom.

Besides printing a special indication for the special counters, I also provide special indicators 5 for the same. (See Figs. 1 and 5.) These indicators are cylindrical in form and are journaled in the frame at the back and front of the machine, above the regular amount-indicators. Each of these indicators is provided with four indicating characters designating the four counters and also with a gear-wheel 79, said gears meshing with a common gear 80. This latter gear is connected to the gear 158 by an idle gear 161, so that it may receive a variable movement, according to the movement of the segment 6 of the special counter-key bank. The characters are so arranged on the respective indicators 5 that the indications will be similar at both the back and front of the machine.

The connections between the special clerk's keys and their printing segment and indicator are substantially as in said patent and needs no further description here.

By means of the before-mentioned star-wheels 146 and the locking and alining pawls for the same all danger of overthrow, misalinement, or accidental movement of the parts is obviated, as said pawls positively engage and lock the type-segments during the printing operation.

In machines of this particular type it is very desirable to trip or release the operating mechanism, which, as shown, is actuated by a crank-handle by the operation of the keys in one of the banks only, and thus compel an operation of a key in said bank before the machine can be actuated. To accomplish this result, I provide a transverse rock-shaft 169, (see Figs. 1 and 5,) upon the outer end of which is mounted a latch-lever 170, as shown in Fig. 6. The upper end of this lever is formed with a latching-nose 171, which coacts with a cam 172, fast to the shaft carrying the crank-handle and formed with a locking-shoulder 171ª, having a beveled corner. The lever 170 is normally drawn forward by a coil-spring 173, which connects it to the main frame, so as to cause its nose to project over the entire length of the shoulder of the cam 172, and thus lock the latter against rotation. When the shaft 169 is rocked, the locking-nose is disengaged from a portion of the said shoulder and the machine left free to be operated. This rocking is accomplished by an arm 174, (see Figs. 1 and 16,) fast to said shaft 169 and having an inclined nose arranged to be actuated by a bevel-faced stud 175, mounted on the detent of the clerk's initial bank. As this detent is only raised when a key of its respective bank is operated, it will be seen that the machine cannot be operated unless a key in the particular bank be depressed. The said shaft is not fully rocked by the operation of a key in the special bank, but only far enough to bring the nose 171 over the bevel corner of the shoulder 171ª. When the crank-handle is operated, this bevel corner engages the nose and forces the same outward to operate the lever 170 and fully rock the shaft 169. As the movement of the operating-handle continues the nose 171 bears upon the periphery of the cam 172, and thus prevents the return of the shaft until the handle has completed its movement.

In addition to the aforesaid operating-arm the shaft 169 also carries a series of latching-arms 176, each of which is provided with a spring-pressed pawl 177. (See Figs. 4 and 10.) After the shaft 169 has been fully rocked by the movement of the operating-handle, as before described, the arms 176 have been moved so far forward as to bring the lower ends of the pawls 177 into the paths of bevel-studs 178, mounted on the respective key-detents, and thus prevent the operation of any of said detents that have not been previously raised. When the elevated detents are released and descend during the operation of the machine, the bevel portions of the studs 178 force the pawls 177 back against the tensions of their springs, so as to pass below the same, and thus be prevented from again rising during the same operation of the machine. When the operating-handle completes its movement, the shaft 169 is permitted to assume its normal position, and the arms 176 are thus rocked rearward, which operation removes the pawls 177 out of the paths of the studs 178. It will be seen that by thus preventing a double operation of the keys in a bank during a single operation of the machine, that all fraudulent manipulation of the machine is prevented. As the amount and clerk's-initial indicators shown in connection with the present invention are constructed and operated substantially as shown and described in the aforesaid patent, no further description of the same is deemed necessary here.

Having thus described my invention, what I claim as new, and desire to secure by Letters Patent, is—

1. In a cash-register, the combination with an operating mechanism, of a plurality of movable counters arranged to be brought into connection therewith, devices connected to the movable parts of the machine for moving said counters to effect this connection, movable means on said counters arranged to be engaged by said devices, and keys for moving said means into the path of said devices.

2. In a cash-register, the combination with operating devices, of a totalizing-counter and a series of special counters mounted respectively on independent movable frames; the frame of said totalizing-counter being arranged to be normally moved to bring its counter into connection with the operating devices, and means arranged to be operated, when a special counter is set to be thrown, to positively move the totalizing-counter frame out of its normal position.

3. In a cash-register, the combination with a plurality of operating-gears, of a plurality of movable counters, movable throwing-arms on the respective counters, a throwing device connected to the movable parts of the machine, and keys for moving the throwing-arms into the path of the throwing device.

4. In a cash-register, the combination with a plurality of operating-gears, of a plurality of counters normally out of mesh therewith, a movable arm on each counter, special keys for moving said arms into operative positions, and devices connected to the movable portions of the machine and arranged to engage said arms to draw the counters forward into mesh with the operating-gears.

5. In a cash-register, the combination with a plurality of operating-gears, of a plurality of counters normally out of mesh therewith, a movable arm on each counter, keys for operating said arms, and a pivoted throwing-segment connected to the movable parts of the machine and provided with projections arranged to catch and operate the movable arms.

6. In a cash-register, the combination with operating devices, of a totalizing-counter and a series of special counters, operating-arms mounted on said counters, an operating-segment arranged to normally engage only the arm of the totalizing-counter to throw the same into engagement with the operating devices, means for bringing the arms of the special counters into the path of the segment and devices for rendering the totalizing-counter inoperative when one of the special counters is set for operation.

7. In a cash-register, the combination with operating devices, of a totalizing-counter and a series of special counters normally out of connection with the operating devices, a movable frame arranged to normally draw the totalizing-counter into connection with the operating mechanism, devices for moving the special counters so that they will be similarly operated by said frame and means for rendering the totalizing-counter inoperative when a special counter is set for operation.

8. In a cash-register, the combination with an operating mechanism of a plurality of movable counters arranged to be moved into connection therewith, a movable operating-arm mounted on each counter, a trip-arm connected to said operating-arm, and a key for operating said trip-arm.

9. In a cash-register, the combination with a series of operating-gears, of a series of counters arranged to be moved into mesh therewith, throwing-arms mounted on said counters, a pivoted segment having projections arranged to catch and operate said arms and keys for moving said arms into the paths of said projections.

10. In a cash-register, the combination with an operating mechanism, of a plurality of pivoted counters arranged to be moved into connection with the same, pivoted throwing-levers mounted on said counters, keys for moving said levers, and devices arranged to act as stops for said levers after the operation of the machine has commenced.

11. In a cash-register, the combination with an operating mechanism, of a plurality of pivoted counters arranged to be moved into connection with the same, pivoted throwing-levers mounted on said counters, keys for moving said levers, an operating-segment arranged to engage said levers and a segment arranged to act as a stop for said levers after the operation of the machine has commenced.

12. In a cash-register, the combination with an operating mechanism, of a totalizing-counter, and a series of special movable counters arranged to be brought into connection therewith, a movable segmental frame, arranged to throw out the totalizing-counter, and projections on the special counters adapted to operate said segment.

13. In a cash-register, the combination with operating devices, of a series of operating-gears, a rock-frame carrying devices for connecting said devices and said gears and connected to the movable parts of the machine, a totalizing-counter and a series of special counters; the former being arranged to be normally thrown into connection with the operating devices, and means independent of the rock-frame and its connecting devices and arranged to be operated when a special counter is thrown into operative position to render the totalizing-counter inoperative.

14. In a cash-register, the combination with an operating mechanism, of a series of independent counters arranged to be moved into connection therewith, movable devices mounted on the counters and arranged to be set to cause the throwing of the counters, a movable segment arranged to be actuated by any one of said devices and a totalizing-counter arranged to be thrown out of operative condition by said segment.

15. In a cash-register, the combination with an operating mechanism, of a plurality of movable counters arranged to be brought into connection therewith, movable devices mounted on said counters and arranged to be set for throwing the same, and a common throwing means arranged to engage any of said devices which have been set.

16. In a cash-register, the combination with an operating mechanism, of a plurality of independent counters, movable devices mounted on said counters and arranged to be set for throwing the same, keys for setting said devices and a common throwing means arranged to engage any of the said devices which have been set.

17. In a cash-register, the combination with an operating mechanism, of a series of counters arranged to be brought into coöperation therewith at will, movable throwing-arms mounted on said counters, a pivoted segment having projections arranged to catch and operate said arms, and keys for moving said arms into the paths of said projections at will.

18. In a cash-register, the combination with an operating mechanism, of a series of counters arranged to be moved into connection therewith at will, movable throwing devices mounted on said counters, a movable segment having projections adapted to catch and operate said devices, springs for normally holding said devices out of the paths of said projections and keys for moving said devices into the paths of said projections at will.

19. In a cash-register, the combination with an operating mechanism, of a plurality of movable counters arranged to be brought into connection therewith, pivoted throwing-arms mounted on said counters, keys for setting said arms for operation and a movable member having projections arranged to operate the throwing-arm which has been set by its key and also lock the remaining throwing-arms.

20. In a cash-register, the combination with an operating mechanism, of a plurality of movable counters arranged to be brought into connection therewith, movable throwing-arms mounted on said counters, keys for moving said arms, and a pivoted segment arranged to operate the throwing-arm which has been set by its key and also lock the remaining throwing-arms.

21. In a cash-register, the combination with an operating mechanism, of a plurality of movable counters arranged to be brought into connection therewith, movable throwing devices mounted on said counters, keys for moving said devices and a movable member arranged to operate the throwing device which has been set and simultaneously lock the remaining throwing devices.

22. In a cash-register, the combination with an operating mechanism, of a series of independent counters, movable throwing devices on said counters, keys for setting said devices for operation, a printing mechanism and devices arranged to be operated by the keys for setting said printing mechanism to print a character corresponding to the operated keys.

23. In a cash-register, the combination with an operating mechanism, of a plurality of movable counters arranged to be brought into connection therewith, movable throwing-arms mounted on said counters and carrying operating projections, and pivoted segments arranged to coöperate with said projections, one to be operated thereby and the other to operate the same, and means actuated by the operated segment to throw out one of the counters.

24. In a cash-register, the combination with an operating mechanism, of a series of counters arranged to be brought into connection therewith, movable throwing-arms mounted on said counters and a movable segment having bevel-faced projections arranged to be engaged by said throwing-arms whereby the throwing-arm of one of said counters is thrown out of operative position when any one of the other arms is thrown into such operative position.

25. In a cash-register, the combination with an operating mechanism, of a series of independent counters, a pivoted throwing-arm mounted on each counter, a movable throwing member normally engaging the arm of one of said counters, and a pivoted segment arranged to be operated by the arms of the remaining counters to disengage said first-mentioned arm from the throwing member.

26. In a cash-register, the combination with an operating mechanism, of a series of independent counters, a pivoted throwing-arm mounted on each counter, a pivoted throwing-segment normally engaging the arm of one of the counters, and a movable member having incline projections arranged to be moved by the arms of the remaining counters to disengage said first-mentioned arm from the throwing member.

27. In a cash-register, the combination with an operating mechanism, of a series of special counters, a pivoted throwing-arm mounted on each counter, a movable member for engaging said arm to throw the counters, a pivoted segment having bevel-faced lugs arranged to be engaged and operated by said arms, a totalizing-counter having a throwing-arm normally in engagement with the movable member, and arranged to be engaged by one of the bevel-lugs and forced out of such engagement with the movable member upon the setting of one of the special counters.

28. In a cash-register a counter comprising a rotary shaft, a series of counter-wheels journaled thereon, a cam arranged to turn with said shaft, a pawl coöperating with said cam and arranged to arrest the shaft when the counter-wheels have reached zero position, and independent means for giving the cam an additional turn to disengage the pawl from the cam and release said shaft.

29. In a cash-register a counter comprising a rotary shaft, a series of counter-wheels mounted thereon, a cam mounted on said shaft, a pinion also mounted on said shaft and carrying a locking-pin, a pawl coöperating with said cam and arranged to engage the pin and arrest the shaft when the counter-wheels have reached the zero position, and independent means for giving the cam an additional movement to release the pawl from the pin.

30. In a cash-register a counter comprising a rotary shaft, a series of counter-wheels mounted thereon, a cam loose on said shaft, an operating-gear fast to said shaft and having a lost-motion connection with said cam, a pin on said gear, a pawl coöperating with said cam and arranged to arrest said pin, and means for giving said cam an independent movement to allow the pawl to disengage from the pin.

31. In a cash-register a counter comprising a rotary shaft, a series of counter-wheels mounted thereon, a cam loose on said shaft but having a lost-motion connection therewith, a pawl coöperating with said cam and arranged to engage a pin moving with the shaft to arrest it and the shaft at zero position and transfer devices arranged to give the cam an independent movement to release the pawl from the pin.

32. In a cash-register, a counter comprising a rotary shaft, a series of counter-wheels mounted thereon, a cam loose on said shaft, a pinion fast to the shaft and having a lost-motion connection with the cam, a locking-pin on said pinion, a bell-crank pawl having one of its arms engaging the periphery of said cam and the other formed with a hook adapted to arrest the pin on said cam, and means for giving said cam an independent movement.

33. In a cash-register, the combination with an operating mechanism, of a series of independent counters arranged to be brought into connection therewith and each comprising a rock-frame carrying counter-wheels, a rock-shaft mounted in said frame, a trip-arm mounted on one end of said shaft, and a throwing-arm mounted on the opposite end of the same, a key for operating said trip-arm and means for operating the throwing-arm upon the operation of the machine.

34. In a cash-register, the combination with an operating mechanism, of a counter comprising a rotary shaft, a series of counter-wheels mounted thereon, a cam arranged to turn with said shaft when it is rotated to turn the counter-wheels to zero, a rock-shaft carrying a pawl arranged to be operated by said cam, a series of transfer-levers, and arms mounted on the rock-shaft for raising the levers out of operative positions.

35. In a cash-register, the combination with an operating mechanism, of a counter comprising a rotary shaft, a series of counter-wheels mounted thereon, a cam mounted on said shaft, a pawl coöperating with said cam, a series of ratchet-wheels mounted on the respective counter-wheels, a series of transfer-levers arranged to engage said ratchet-wheels, and a rock-shaft arranged to be operated by the pawl and provided with arms for holding the transfer-levers away from the ratchet-wheels.

36. In a cash-register the combination with an operating mechanism, of a counter comprising a rotary shaft, a series of counter-wheels mounted thereon, a cam mounted on said shaft, a pawl engaging said cam and also arranged to arrest a pin carried by the shaft, an arm adapted to give said cam an independent movement and transfer devices arranged to operate said arm.

37. In a cash-register the combination with an operating mechanism, of a counter comprising a rotary shaft, a series of counter-wheels mounted thereon, a cam loose on said shaft, a pinion fast to the shaft and having a lost-motion connection with the cam, a pawl coöperating with said cam, a pin mounted on the cam and arranged to engage the pawl, an arm for giving the cam an independent movement, transfer devices and means for communicating the movements of the transfer devices to said arm.

38. In a cash-register the combination with an operating mechanism of a counter comprising a shaft, a series of counter-wheels mounted thereon and each provided with a cam-wheel and a ratchet-wheel and a series of transfer devices each of which comprises a pivoted yoke-shaped lever one arm of which is arranged to be struck by one of the cams, a pawl mounted on the other arm of said lever and engaging one of the ratchet-wheels, and springs for forcing said levers in one direction.

In testimony whereof I affix my signature in the presence of two witnesses.

JOSEPH P. CLEAL.

Witnesses:
 WILLIAM H. MUZZY,
 IRA BERKSTRESSER.